US010292149B2

(12) United States Patent
Wang et al.

(10) Patent No.: US 10,292,149 B2
(45) Date of Patent: May 14, 2019

(54) PHYSICAL DOWNLINK CONTROL CHANNEL TRANSMISSION METHOD AND APPARATUS

(71) Applicant: CHINA ACADEMY OF TELECOMMUNICATIONS TECHNOLOGY, Beijing (CN)

(72) Inventors: Jiaqing Wang, Beijing (CN); Xueming Pan, Beijing (CN); Weijie Xu, Beijing (CN); Qianqian Si, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/759,213

(22) PCT Filed: Aug. 4, 2016

(86) PCT No.: PCT/CN2016/093232
§ 371 (c)(1),
(2) Date: Mar. 10, 2018

(87) PCT Pub. No.: WO2017/041601
PCT Pub. Date: Mar. 16, 2017

(65) Prior Publication Data
US 2018/0255534 A1    Sep. 6, 2018

(30) Foreign Application Priority Data

Sep. 11, 2015   (CN) .......................... 2015 1 0580546

(51) Int. Cl.
*H04W 72/04*    (2009.01)
*H04L 5/00*     (2006.01)
(Continued)

(52) U.S. Cl.
CPC ......... *H04W 72/042* (2013.01); *H04L 5/0053* (2013.01); *H04W 16/14* (2013.01);
(Continued)

(58) Field of Classification Search
CPC ............. H04W 72/04; H04W 72/0406; H04W 72/042; H04W 72/044; H04W 72/0446; H04W 72/0453
See application file for complete search history.

(56) References Cited

U.S. PATENT DOCUMENTS 9,571,238 B2 *   2/2017   Gao ................... H04W 72/1273
2011/0274066 A1 * 11/2011   Tee ......................... H04L 5/001
                                                                370/329
(Continued)

FOREIGN PATENT DOCUMENTS

CN    103477579 A    12/2013
CN    103959877 A     7/2014
(Continued)

OTHER PUBLICATIONS

IP Office of P.R. China—International Search Report of the International Searching Authority (with English Translation) dated Oct. 25, 2016 for International Application No. PCT/CN2016/093232 (6 pgs).
(Continued)

*Primary Examiner* — Kevin D Mew
(74) *Attorney, Agent, or Firm* — Womble Bond Dickinson (US) LLP

(57) ABSTRACT

Disclosed are a physical downlink control channel transmission method and apparatus, which are used for achieving, in the case where an initial signal or signalling which indicates an initial position of a physical downlink shared channel is not transmitted, a method in which a physical downlink control channel is used for transmitting and indicating an
(Continued)

initial position of a physical downlink shared channel. The method comprises: a terminal determining, according to each candidate time position in a set of candidate time positions and a set of candidate physical downlink control channel/enhanced physical downlink control channel resource positions corresponding to the candidate time position respectively, a physical downlink control channel/enhanced physical downlink control channel bearing downlink control information in an unauthorized frequency band wireless frame; and the terminal receiving the downlink control information by means of the determined physical downlink control channel/enhanced physical downlink control channel.

20 Claims, 5 Drawing Sheets

(51) Int. Cl.
*H04W 16/14* (2009.01)
*H04W 74/08* (2009.01)
*H04W 72/12* (2009.01)

(52) U.S. Cl.
CPC ...... *H04W 72/044* (2013.01); *H04W 72/1289* (2013.01); *H04W 74/0808* (2013.01)

(56) References Cited

U.S. PATENT DOCUMENTS

| | | | |
|---|---|---|---|
| 2013/0044700 A1 | 2/2013 | Cheng | |
| 2013/0242882 A1* | 9/2013 | Blankenship | H04W 72/042 370/329 |
| 2013/0242890 A1* | 9/2013 | He | H04W 72/0413 370/329 |
| 2013/0242947 A1* | 9/2013 | Chen | H04W 72/04 370/335 |
| 2014/0056279 A1* | 2/2014 | Chen | H04W 52/04 370/330 |
| 2014/0126487 A1* | 5/2014 | Chen | H04B 15/00 370/329 |
| 2014/0146768 A1* | 5/2014 | Seo | H04L 5/001 370/329 |
| 2014/0161092 A1* | 6/2014 | Seo | H04L 5/0053 370/329 |
| 2014/0241300 A1* | 8/2014 | Park | H04L 5/0053 370/329 |
| 2015/0098409 A1* | 4/2015 | Li | H04W 72/042 370/329 |
| 2015/0256403 A1* | 9/2015 | Li | H04W 4/70 370/235 |
| 2015/0289234 A1* | 10/2015 | Zhao | H04L 1/1861 370/329 |

FOREIGN PATENT DOCUMENTS

| | | |
|---|---|---|
| CN | 104081851 A | 10/2014 |
| WO | WO 2013/131268 A1 | 9/2013 |
| WO | WO 2015006919 A1 | 1/2015 |

OTHER PUBLICATIONS

IP Office of P.R. China—Written Opinion of the International Searching Authority (with English Translation) dated Oct. 25, 2016 for International Application No. PCT/CN2016/0932 (6 pgs).
Extended European Search Report for EPO Application No. EP 16843539.4, 10 pgs. (dated Jul. 18, 2018).
Huawei, HiSilicon, "Discontinuous transmission and partial subframe design for LAA," 3GPPP TSG RAN WG1 Meeting #81, R1-152471, Fukuoka, Japan, 5 pgs. (May 25-29, 2015).
Panasonic, "Indication methods for partial subframe," 3GPP TSG RAN WG1 Meeting #82, R1-153975, Beijing, China, 4 pgs. (Aug. 24-28, 2015).

\* cited by examiner

PHYSICAL DOWNLINK CONTROL CHANNEL TRANSMISSION METHOD AND APPARATUS

CROSS-REFERENCE TO RELATED APPLICATIONS

This patent application is a U.S. National Phase application under 35 U.S.C. § 371 of International Application No. PCT/CN2016/093232, filed on 4 Aug. 2016, entitled PHYSICAL DOWNLINK CONTROL CHANNEL TRANSMISSION METHOD AND APPARATUS, which claims the benefit of priority from Chinese Patent Application No. CN 201510580546.3, filed with the Chinese Patent Office-on Sep. 11, 2015, and entitled "A method and apparatus for transmitting a physical downlink control channel", which was incorporated by reference in its entirety.

FIELD

The present invention relates to the field of communications, and particularly to a method and apparatus for transmitting a physical downlink control channel.

BACKGROUND

There is no particular application system planned over any unlicensed spectrum, so the unlicensed spectrum resources can be shared by various wireless communication systems, e.g., Bluetooth, WiFi (Wireless Fidelity), etc., through preempting the resources. Sharing of the unlicensed spectrum resources between Long Term Evolution-Unlicensed (LTE-U) systems deployed by different operators, and between an LTE-U system and a WiFi or another wireless communication system has been studied as a focus and a difficulty. As specified by the 3GPP, the wireless communication systems shall coexist in a fair mode, where an unlicensed frequency band operates as a secondary carrier with the assistance of a primary carrier in a licensed frequency band. The Listen Before Talk (LBT) is a general contention access mode in the LTE-U system.

An 802.11 system operates with a channel access mechanism which is referred to as the Carrier Sense Multiple Access/Collision Avoidance (CSMA/CA) mechanism, and the WiFi system preempts a resource over an unlicensed frequency spectrum as illustrated in FIG. 1, where the particular process is as follows: firstly the WiFi system listens to a channel, and when the channel has been idle for a period of time reaching a Distributed channel access Inter-Frame Space (DIFS), it determines that the current channel is an idle channel; and then respective stations waiting for an access to the channel enter a random backoff stage, so that the stations can be avoided from colliding with each other over the same resource. For the sake of fairness, none of the stations can occupy any unlicensed spectrum resource for a long period of time, but each station shall release its occupied unlicensed spectrum resource after some period of time elapses, or an upper limit of the amount of transmitted data is reached, so that the resource can be preempted by another system.

In order to provide a flexible, fair, and adaptive channel access mechanism, the LBT technology is required in Europe to be applied in the unlicensed frequency bands of 5150 to 5350 MHz, and 5470 to 5725 MHz. Clear Channel Assessment (CCA) determines whether there is a signal being currently transmitted over the channel, as a result of energy detection to thereby determine whether the channel is occupied. Equipment in an unlicensed frequency band is categorized in the European Telecommunications Standards Institute (ETSI) standard into frame-based and load-based equipment corresponding respectively to two access mechanisms: Frame Based Equipment (FBE) and Load Based Equipment (LBE), where the LBE access mechanism is similar to the CSMA/CA mechanism of the WiFi system.

In the LBE channel access mechanism, a period of time for which, and a start point at which the channel is occupied by each transmission are varying, so extended CCA detection is performed before the channel is accessed. Where firstly a random factor N is generated according to a size q of a Contention Window (CW), and the channel will not be accessed until the channel has been idle for a period of time which is N times a CCA period of time (i.e., q) and the channel is idle, then data transmission procedure is initiated; and the channel can be occupied for a largest length of time, which is 13 milliseconds (ms). There are two options A and B for the LBE, where there is a fixed contention window of the option B, and this is a general LBE form; and FIG. 2 illustrates a schematic diagram of a channel access mechanism for the ESTI LBE option B.

As currently studied in the 3GPP, two LBT categories are defined as the LBT category 3 and the LBT category 4 respectively for transmission by the load-based equipment. There is a fixed contention window for the LBT category 3, and the ESTI LBE option B belongs to the LBT category 3; and the ESTI LBE option B is modified into the LBT category 4, and the load-based LBT is applied to the LBT category 4, and a contention window thereof is extended exponentially, or configured semi-statically. Since the contention window is extended exponentially in the WiFi system operating with the CSMA/CA access mechanism, in order to enable the LTE-U to coexist with the WiFi system in a fair mode, the LBT category 4 shall be applied at least to downlink transmission in the LTE-U system as required in the 3GPP.

In the LTE system, downlink control information is carried in a Physical Downlink Control Channel (PDCCH), and the number of resources for the PDCCH in carrier aggregation is relatively stable, and can be indicated semi-statically via higher-layer signaling, so a start position of a Physical Downlink Shared Channel (PDSCH) can be determined by decoding the PDCCH. The PDCCH is shared by multiple users, and terminals need to search for their control signaling throughout a control area under a certain rule. There are generally two categories of PDCCH resources to be detected blindly, where one category includes PDCCH resources in a common search space, and the other category includes PDCCH resources in a User Equipment (UE) specific search space; and there are different aggregation levels of a Control Channel Element (CCE), and also different numbers of corresponding channel resources, in each search space particularly as depicted in Table 1.

TABLE 1

| | Search space | | |
|---|---|---|---|
| Type | Aggregation level | The number of CCEs | The number of PDCCH resources |
| UE specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In the common search space, the aggregation level of CCEs is 4, and the number of PDCCH resources to be detected blindly is 4; or the aggregation level of CCEs is 8, and the number of PDCCH resources to be detected blindly is 2. For example, if there are only two Downlink Control Information (DCI) formats with different lengths to be detected blindly in the common search space, a terminal will detect blindly in the PDCCH common search space for a number 2*(4+2)=12 of times.

In the terminal specific search space, the aggregation level of CCEs can be 1, 2, 4, or 8, and the corresponding numbers of PDCCH resources to be detected blindly at the respective aggregation levels of CCEs are {6, 6, 2, 2} respectively. For example, if there are also only two DCI formats with different lengths to be detected blindly in the terminal specific search space, where one of the DCI formats is dependent upon a transmission mode in which the terminal currently operates (see Section 36.213 for details thereof), the terminal will detect blindly in the terminal specific common search space for a number 2*(6+6+2+2)=32 of times.

As can be apparent from the structure of an LTE frame, a signal is transmitted in the unit of a 1 ms sub-frame in the LTE system. However the LBT mechanism must be applied to downlink transmission in the LTE-U system, so it is very likely for a start point of time, at which an LTE-U signal is transmitted, to be any position in a channel access sub-frame instead of a start boundary of the sub-frame due to the factor of a contention access. Two sub-frame structures are currently supported in the standard, where the first sub-frame structure is referred to as a partial sub-frame, that is, a part of Orthogonal Frequency Division Multiplex (OFDM) symbols in the channel access sub-frame is a separate Transmission Time Interval (TTI) of less than 1 ms; and the other sub-frame structure is referred to as a floating sub-frame, that is, a part of OFDM symbols in a sub-frame, and a part of OFDM symbols in an adjacent sub-frame succeeding thereto constitute an integral TTI with the length of time, which is 1 ms. Accordingly there is a PDCCH/ePDCCH transmission mode over an unlicensed carrier apparently distinguished from a PDCCH/ePDCCH transmission mode in a licensed frequency band; no matter it is a partial sub-frame or a floating sub-frame.

There has been absent so far a solution to indicate a start position of a PDSCH by transmitting a PDCCH, without transmitting any initial signal, or any signaling indicating the start position of the PDSCH, in the case that an unlicensed frequency band is preempted with a random access.

SUMMARY

Embodiments of the invention provide a method and apparatus for transmitting a physical downlink control channel so as to transmit a start position of a PDSCH by transmitting the PDCCH, without transmitting any initial signal, or any signaling indicating the start position of the PDSCH.

Particular technical solutions according to the embodiments of the invention are as follows.

An embodiment of the invention provides a method for transmitting a physical downlink control channel, the method including: determining, by a terminal, a PDCCH/ePDCCH, to carry Downlink Control Information (DCI), in a radio frame in an unlicensed frequency band according to each candidate temporal position in a set of candidate temporal positions, and a set of candidate PDCCH/ePDCCH resource positions corresponding to the each candidate temporal position; and receiving, by the terminal, the DCI in the determined PDCCH/ePDCCH.

In an implementation, before the terminal determines the PDCCH/ePDCCH, to carry the DCI, in the radio frame, the method further includes: receiving, by the terminal, the set of candidate temporal positions, and sets of candidate PDCCH/ePDCCH resource positions corresponding respectively to respective candidate temporal positions in the set of candidate temporal positions, transmitted by a base station.

In an implementation, the set of candidate temporal positions, and the sets of candidate PDCCH/ePDCCH resource positions corresponding respectively to the respective candidate temporal positions in the set of candidate temporal positions are prescribed between the terminal and the base station.

In an implementation, determining, by the terminal, the PDCCH/ePDCCH, to carry the DCI, in the radio frame according to the each candidate temporal position, and the set of candidate PDCCH/ePDCCH resource positions corresponding to the each candidate temporal position includes: detecting, by the terminal, blindly at each candidate PDCCH/ePDCCH resource position in each set of candidate PDCCH/ePDCCH resource positions, so as to determine the PDCCH/ePDCCH, to carry the DCI, in the radio frame.

In an implementation, a sum of numbers of candidate PDCCH/ePDCCH resource positions in respective sets of candidate PDCCH/ePDCCH resource positions corresponding respectively to the respective candidate temporal positions in the set of candidate temporal positions is not greater than a preset value.

An embodiment of the invention provides a method for transmitting a physical downlink control channel, the method including: determining, by a base station, a candidate temporal position at which a PDCCH/ePDCCH is transmitted in an unlicensed frequency band, according to a set of candidate temporal positions, wherein each candidate temporal position in the set of candidate temporal positions corresponds to a set of candidate PDCCH/ePDCCH resource positions; and selecting, by the base station, a candidate PDCCH/ePDCCH resource position from a set of candidate PDCCH/ePDCCH resource positions corresponding to the determined candidate temporal position, and transmitting the PDCCH/ePDCCH at the determined candidate temporal position in the radio frame according to the selected candidate PDCCH/ePDCCH resource position.

In an implementation, determining, by the base station, the candidate temporal position at which the PDCCH/ePDCCH is transmitted in the unlicensed frequency band, according to the set of candidate temporal positions includes: selecting, by the base station, a candidate temporal position from the set of candidate temporal positions according to a start temporal position at which a channel is accessed, after accessing the channel in the unlicensed frequency band, wherein the PDCCH/ePDCCH is to be transmitted at the selected candidate temporal position; or selecting, by the base station, a candidate temporal position from the set of candidate temporal positions, determining the start temporal position at which the channel is accessed in the unlicensed frequency band, according to the selected candidate temporal position, and determining that the PDCCH/ePDCCH is to be transmitted at the selected candidate temporal position.

In an implementation, the set of candidate temporal positions, and sets of candidate PDCCH/ePDCCH resource positions corresponding respectively to respective candidate temporal positions in the set of candidate temporal positions are prescribed between the base station and a terminal.

In an implementation, before the base station determines the candidate temporal position at which the PDCCH/ePDCCH is transmitted in the unlicensed frequency band, according to the set of candidate temporal positions, the method further includes: determining, by the base station, the set of candidate temporal positions, and allocating, for the respective candidate temporal positions in the set of candidate temporal positions, their corresponding sets of candidate PDCCH/ePDCCH resource positions.

In an implementation, after the base station determines the set of candidate temporal positions, and allocates, for the respective candidate temporal positions in the set of candidate temporal positions, their corresponding sets of candidate PDCCH/ePDCCH resource positions, the method further includes: transmitting, by the base station, the set of candidate temporal positions, and the sets of candidate PDCCH/ePDCCH resource positions corresponding respectively to the respective candidate temporal positions in the set of candidate temporal positions to the terminal.

In an implementation, a sum of numbers of candidate PDCCH/ePDCCH resource positions in respective sets of candidate PDCCH/ePDCCH resource positions corresponding respectively to the respective candidate temporal positions in the set of candidate temporal positions is not greater than a preset value.

An embodiment of the invention provides a terminal including: a determining module configured to determine a PDCCH/ePDCCH, to carry Downlink Control Information (DCI), in a radio frame in an unlicensed frequency band according to each candidate temporal position in a set of candidate temporal positions, and a set of candidate PDCCH/ePDCCH resource positions corresponding to the each candidate temporal position; and a receiving module configured to receive the DCI in the determined PDCCH/ePDCCH.

In an implementation, the receiving module is further configured to: receive the set of candidate temporal positions, and sets of candidate PDCCH/ePDCCH resource positions corresponding respectively to respective candidate temporal positions in the set of candidate temporal positions, transmitted by a base station.

In an implementation, the set of candidate temporal positions, and sets of candidate PDCCH/ePDCCH resource positions corresponding respectively to the respective candidate temporal positions in the set of candidate temporal positions are prescribed between the terminal and the base station.

In an implementation, the determining module is configured to: detect blindly at each candidate PDCCH/ePDCCH resource position in each set of candidate PDCCH/ePDCCH resource positions, so as to determine the PDCCH/ePDCCH, to carry the DCI, in the radio frame.

In an implementation, a sum of numbers of candidate PDCCH/ePDCCH resource positions in respective sets of candidate PDCCH/ePDCCH resource positions corresponding respectively to the respective candidate temporal positions in the set of candidate temporal positions is not greater than a preset value.

An embodiment of the invention provides a base station including: a first processing module configured to determine a candidate temporal position at which a PDCCH/ePDCCH is transmitted in an unlicensed frequency band, according to a set of candidate temporal positions, wherein each candidate temporal position in the set of candidate temporal positions corresponds to a set of candidate PDCCH/ePDCCH resource positions; and a second processing module configured to select a candidate PDCCH/ePDCCH resource position from a set of candidate PDCCH/ePDCCH resource positions corresponding to the determined candidate temporal position, and to transmit the PDCCH/ePDCCH at the determined candidate temporal position in the radio frame according to the selected candidate PDCCH/ePDCCH resource position.

In an implementation, the first processing module is configured to: select a candidate temporal position from the set of candidate temporal positions according to a start temporal position at which a channel is accessed, after accessing the channel in the unlicensed frequency band, wherein the PDCCH/ePDCCH is to be transmitted at the selected candidate temporal position; or select a candidate temporal position from the set of candidate temporal positions, to determine the start temporal position at which the channel is accessed in the unlicensed frequency band, according to the selected candidate temporal position, and to determine that the PDCCH/ePDCCH is to be transmitted at the selected candidate temporal position.

In an implementation, the set of candidate temporal positions, and sets of candidate PDCCH/ePDCCH resource positions corresponding respectively to respective candidate temporal positions in the set of candidate temporal positions are prescribed between the base station and a terminal.

In an implementation, the first processing module is further configured to: before the candidate temporal position at which the PDCCH/ePDCCH is transmitted in the unlicensed frequency band is determined according to the set of candidate temporal positions, determine the set of candidate temporal positions, and allocate, for the respective candidate temporal positions in the set of candidate temporal positions, their corresponding sets of candidate PDCCH/ePDCCH resource positions.

In an implementation, the base station further includes a transmitting module configured to: transmit the set of candidate temporal positions, and the sets of candidate PDCCH/ePDCCH resource positions corresponding respectively to the respective candidate temporal positions in the set of candidate temporal positions to the terminal.

In an implementation, a sum of numbers of candidate PDCCH/ePDCCH resource positions in respective sets of candidate PDCCH/ePDCCH resource positions corresponding respectively to the respective candidate temporal positions in the set of candidate temporal positions is not greater than a preset value.

With the technical solutions above, in the embodiments of the invention, the base station and the terminal prescribe the set of candidate temporal positions at which the PDCCH is transmitted in the unlicensed frequency band, and the sets of candidate PDCCH/ePDCCH resource positions corresponding respectively to the respective candidate temporal positions in the set of candidate temporal positions, and the base station transmits the PDCCH at a prescribed candidate temporal position, and candidate PDCCH/ePDCCH resource positions corresponding to the prescribed candidate temporal position; and the terminal detects blindly the PDCCH/ePDCCH at prescribed candidate temporal positions, and candidate PDCCH/ePDCCH resource positions corresponding to the prescribed candidate temporal positions, so that a start position of a PDSCH can be determined according to the detected PDCCH without transmitting any initial signal or any signaling indicating the start position of the PDSCH.

DETAILED DESCRIPTION OF THE EMBODIMENTS

In order to make the objects, technical solutions and advantages more apparent, the invention will be described below in further details, and apparently the embodiments as described are merely a part but not all of the embodiments of the invention. All the other embodiments which can occur to those ordinarily skilled in the art from the embodiments here of the invention without any inventive effort shall fall into the scope of the invention as claimed.

In the following description, an implementation with cooperation of the network side and the terminal side will be described, but this will not suggest required cooperation of both the sides for an implementation, and in fact, problems existing respectively at the network side and the terminal side will also be addressed in the separate implementations at the network side and the terminal side, although a better technical effect can be achieved in the implementation with cooperation of both the sides.

Figure 1:
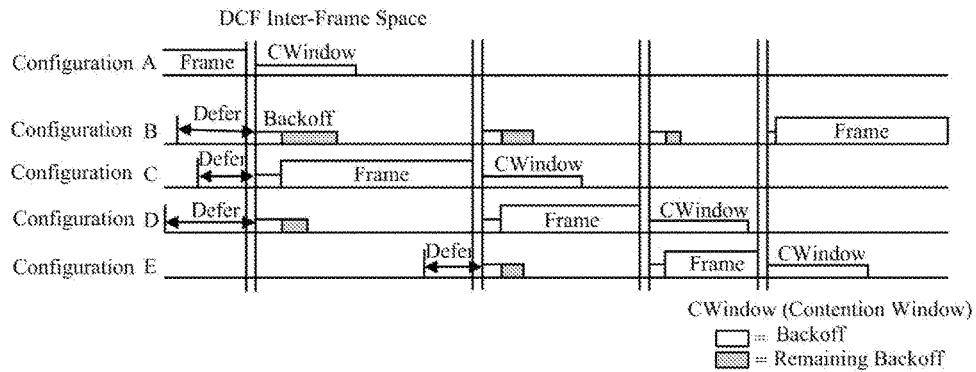
FIG. 1 is a schematic diagram of a WiFi system preempting a resource in an unlicensed spectrum in the background.
Figure 2:
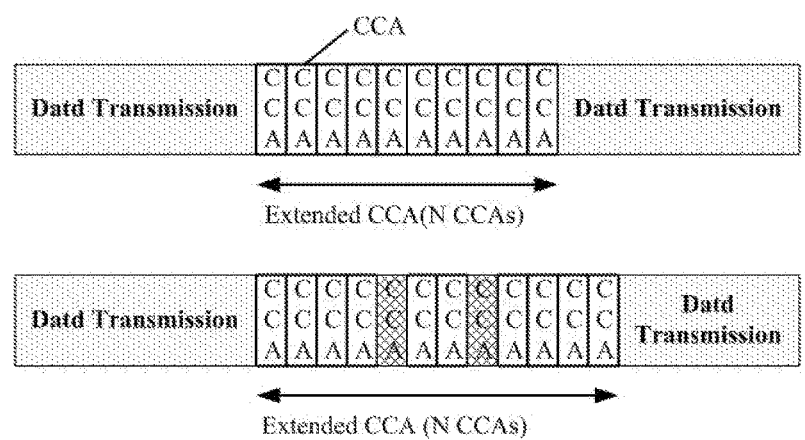
FIG. 2 is a schematic diagram of a channel access mechanism for LBE option B in the background.
Figure 3:
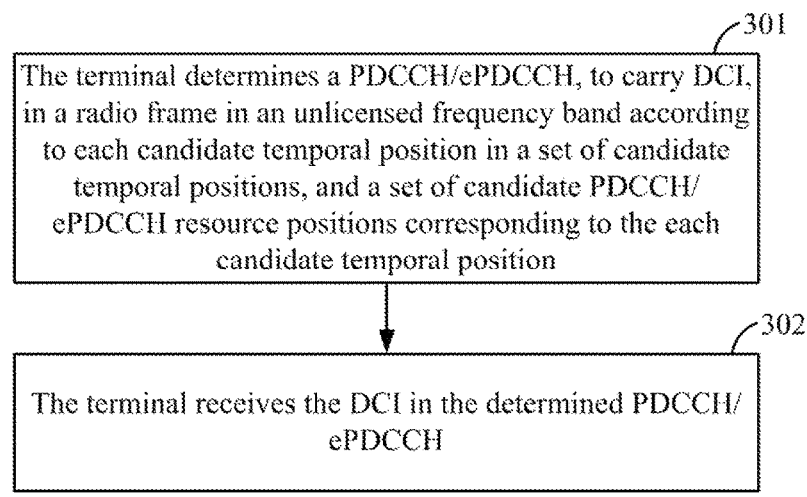
FIG. 3 is a schematic flow chart of a method for transmitting a PDCCH/ePDCCH by a terminal according to an embodiment of the invention.

In an embodiment of the invention, as illustrated in FIG. 3, a flow of a method for transmitting a PDCCH/ePDCCH by a terminal can be as follows.

In the operation 301, the terminal determines a PDCCH/ePDCCH, to carry DCI, in a radio frame in an unlicensed frequency band according to each candidate temporal position in a set of candidate temporal positions, and a set of candidate PDCCH/ePDCCH resource positions corresponding to the each candidate temporal position.

Where the set of candidate temporal positions includes a plurality of candidate temporal positions and each candidate temporal position specifies start time at which a base station can transmit the PDCCH/ePDCCH in the radio frame in the unlicensed frequency band. That is, the set of candidate temporal positions specifies a set of start time at which the base station can transmit the PDCCH/ePDCCH in the radio frame in the unlicensed frequency band.

In an implementation, respective candidate temporal positions in the set of candidate temporal positions may be consecutive OFDM symbols or discrete OFDM symbols, and the candidate temporal positions may be any positions in the radio sub-frame, which are allowed in a protocol.

For example, the set of candidate temporal positions is {2, 4}, that is, the base station can transmit DCI at a start position of the PDCCH/ePDCCH, which is the second OFDM symbol or the fourth OFDM symbol in the radio sub-frame, and it shall be noted that this has been described only by way of an example, but there may be a number of instances for the set of candidate temporal positions, which will not be enumerated here.

In an implementation, the set of candidate temporal positions, and the set of candidate PDCCH/ePDCCH resource positions corresponding to each candidate temporal position can be obtained in the following two approaches.

In a first approach, the terminal receives the set of candidate temporal positions, and sets of candidate PDCCH/ePDCCH resource positions corresponding respectively to respective candidate temporal positions in the set of candidate temporal positions, transmitted by the base station.

In an implementation, the terminal receives the set of candidate temporal positions, and the sets of candidate PDCCH/ePDCCH resource positions corresponding respectively to the respective candidate temporal positions in the set of candidate temporal positions, transmitted by the base station in a licensed frequency band.

In a second approach, the set of candidate temporal positions, and the sets of candidate PDCCH/ePDCCH resource positions corresponding respectively to the respective candidate temporal positions in the set of candidate temporal positions are prescribed between the terminal and the base station.

For example, the set of candidate temporal positions, and the sets of candidate PDCCH/ePDCCH resource positions corresponding respectively to the respective candidate temporal positions in the set of candidate temporal positions are prescribed between the terminal and the base station in a protocol, or configured respectively on the terminal and the base station.

In an implementation, the sum of the numbers of candidate PDCCH/ePDCCH resource positions in the respective sets of candidate PDCCH/ePDCCH resource positions corresponding respectively to the respective candidate temporal positions in the set of candidate temporal positions is not greater than a preset value.

In a particular implementation, the preset value can be determined as a result of simulation of a system, and according to the complexity of the corresponding system, or the preset value can be determined according to the number of all the possible candidate PDCCH/ePDCCH resource positions at respective aggregation levels, for example, the preset value is less than or equal to the total sum of the respective numbers of possible candidate PDCCH/ePDCCH resource positions at the respective aggregation levels.

In an implementation, there may or may not be the same number of candidate PDCCH/ePDCCH resource positions in respective sets of candidate PDCCH/ePDCCH resource positions corresponding respectively to respective candidate temporal positions in the set of candidate temporal positions.

In an implementation, the terminal performs the following process for each candidate temporal position in the set of candidate temporal positions: the terminal detects blindly at each candidate PDCCH/ePDCCH resource position in the set of candidate PDCCH/ePDCCH resource positions corresponding to the candidate temporal position until the PDCCH/ePDCCH carrying the downlink control information is detected.

In a practical application, the terminal detects blindly at each candidate PDCCH/ePDCCH resource position for a number of times determined according to the number of possible lengths of DCI formats, for example, if there are two DCI formats with different lengths, then the terminal will blindly detect twice at each candidate PDCCH/ePDCCH resource position.

In the operation 302, the terminal receives the DCI in the determined PDCCH/ePDCCH.

Figure 4:
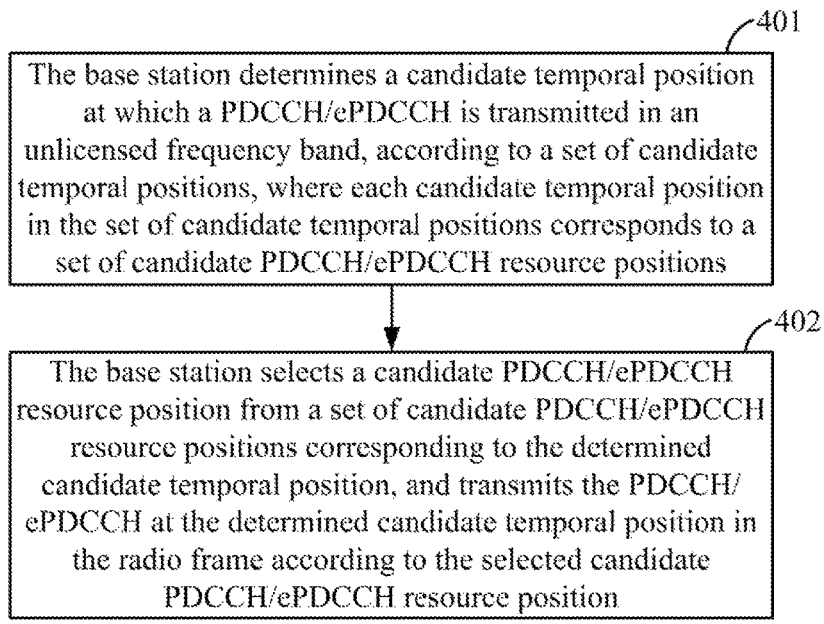
FIG. 4 is a schematic flow chart of a method for transmitting a PDCCH/ePDCCH by a base station according to an embodiment of the invention.

Based upon the same inventive concept, an embodiment of the invention provides a corresponding solution at the base station side, and as illustrated in FIG. 4, a flow of a method for transmitting a PDCCH/ePDCCH by a base station is as follows.

In the operation 401, the base station determines a candidate temporal position at which a PDCCH/ePDCCH is transmitted in an unlicensed frequency band, according to a set of candidate temporal positions, where each candidate temporal position in the set of candidate temporal positions corresponds to a set of candidate PDCCH/ePDCCH resource positions.

Where the set of candidate temporal positions includes a plurality of candidate temporal positions, and each candidate temporal position specifies start time at which the base station can transmit a PDCCH/ePDCCH in a radio frame in the unlicensed frequency band, that is, the set of candidate temporal positions specifies a set of start time at which the base station can transmit the PDCCH/ePDCCH in the radio frame in the unlicensed frequency band.

In an implementation, the respective candidate temporal positions in the set of candidate temporal positions may be consecutive OFDM symbols or discrete OFDM symbols, and the candidate temporal positions may be any positions in the radio sub-frame, which are allowed in a protocol.

In an implementation, the base station determines the candidate temporal position at which the PDCCH/ePDCCH is transmitted in the unlicensed frequency band, according to the set of candidate temporal positions in the following two approaches without any limitation thereto.

In a first approach, the base station selects a candidate temporal position from the set of candidate temporal positions according to a start temporal position at which a channel is accessed, after accessing the channel in the unlicensed frequency band, where the PDCCH/ePDCCH is to be transmitted at the selected candidate temporal position.

In a second approach, the base station selects a candidate temporal position from the set of candidate temporal positions, determines the start temporal position at which the channel is accessed in the unlicensed frequency band, according to the selected candidate temporal position, and determines that the PDCCH/ePDCCH is to be transmitted at the selected candidate temporal position.

In a particular implementation, when the base station accesses a channel in the unlicensed frequency band through LBT, it selects only some candidate temporal position in the set of candidate temporal positions as a start position at which the channel is accessed; or when the base station accesses a channel in the unlicensed frequency band through LBT, it selects a non-boundary position of a preceding OFDM symbol to an OFDM symbol, where some candidate temporal position in the set of candidate temporal positions is located, to access the channel, where a reservation signal can be transmitted in a set of positions starting with the non-boundary position of the preceding OFDM symbol until the boundary between the preceding OFDM symbol, and the succeeding OFDM symbol to the preceding OFDM symbol. For example, if the set of candidate temporal positions is {2, 4}, then the base station will access the PDCCH/ePDCCH, and transmit the DCI only in the second OFDM symbol or the fourth OFDM symbol in the radio sub-frame in the unlicensed frequency band.

In an implementation, the set of candidate temporal positions, and the set of candidate PDCCH/ePDCCH resource positions corresponding to each candidate temporal position can be obtained in the following two approaches.

In a first approach, the set of candidate temporal positions, and sets of candidate PDCCH/ePDCCH resource positions corresponding respectively to the respective candidate temporal positions in the set of candidate temporal positions are prescribed between the base station and the terminal.

In a second approach, before the base station determines the start position at which the channel is accessed in the radio frame in the unlicensed frequency band according to the set of candidate temporal positions, the base station determines the set of candidate temporal positions, and allocates, for the respective candidate temporal positions in the set of candidate temporal positions, their corresponding sets of candidate PDCCH/ePDCCH resource positions.

In the second approach, after the base station determines the set of candidate temporal positions, and allocates, for the respective candidate temporal positions in the set of candidate temporal positions, their corresponding sets of candidate PDCCH/ePDCCH resource positions, it transmits the set of candidate temporal positions, and the sets of candidate PDCCH/ePDCCH resource positions corresponding respectively to the respective candidate temporal positions in the set of candidate temporal positions to the terminal.

In a particular implementation, the base station transmits the set of candidate temporal positions, and the sets of candidate PDCCH/ePDCCH resource positions corresponding respectively to the respective candidate temporal positions in the set of candidate temporal positions to the terminal in a licensed frequency band.

In an implementation, the sum of the numbers of candidate PDCCH/ePDCCH resource positions in the respective sets of candidate PDCCH/ePDCCH resource positions corresponding respectively to the respective candidate temporal positions in the set of candidate temporal positions is not greater than a preset value. The number of candidate PDCCH/ePDCCH resource positions corresponding to each candidate temporal position is limited, so that the number of times for which the terminal detects blindly can be limited to thereby lower the complexity of blind detection, and an overhead.

In an implementation, there may or may not be the same number of candidate PDCCH/ePDCCH resource positions in respective sets of candidate PDCCH/ePDCCH resource positions corresponding respectively to respective candidate temporal positions in the set of candidate temporal positions.

In the operation 402, the base station selects a candidate PDCCH/ePDCCH resource position from a set of candidate PDCCH/ePDCCH resource positions corresponding to the determined candidate temporal position, and transmits the PDCCH/ePDCCH at the determined candidate temporal position in the radio frame according to the selected candidate PDCCH/ePDCCH resource position.

In a particular implementation, since a conclusion in the ongoing 3GPP study is that broadcast information or the like is not transmitted over an unlicensed carrier, so there is no common search space for a PDCCH/ePDCCH over the unlicensed carrier, and if the existing LTE protocol is still applied, that is, there are two DCI formats with different lengths, then the terminal will detect blindly in a specific search space for not greater than 32 times, that is, the sum of the numbers of time for which the terminal detects blindly at the candidate PDCCH/ePDCCH resource positions corresponding to the respective candidate temporal positions in the set of candidate temporal positions is not greater than 32 times. Table 2 depicts a relationship between the numbers of members in respective sets of candidate PDCCH/ePDCCH resource positions corresponding respectively to respective candidate temporal positions, and the numbers of times, for which the terminal detects blindly, corresponding to the respective candidate temporal positions, at respective aggregation levels in the case that there are two candidate temporal positions.

TABLE 2

| Type of search space | CCE aggregation level | The number of times for which the terminal detects blindly | | The number of members in a set of candidate PDCCH/ePDCCH resource positions | |
|---|---|---|---|---|---|
| | | Total number | Position 1 | Position 2 | Position 1 | Position 2 |
| UE specific | 1 | 12 | 6 | 6 | 3 | 3 |
| | 2 | 12 | 6 | 6 | 3 | 3 |
| | 4 | 4 | 2 | 2 | 2 | 2 |
| | 8 | 4 | 2 | 2 | 2 | 2 |

Figure 5:
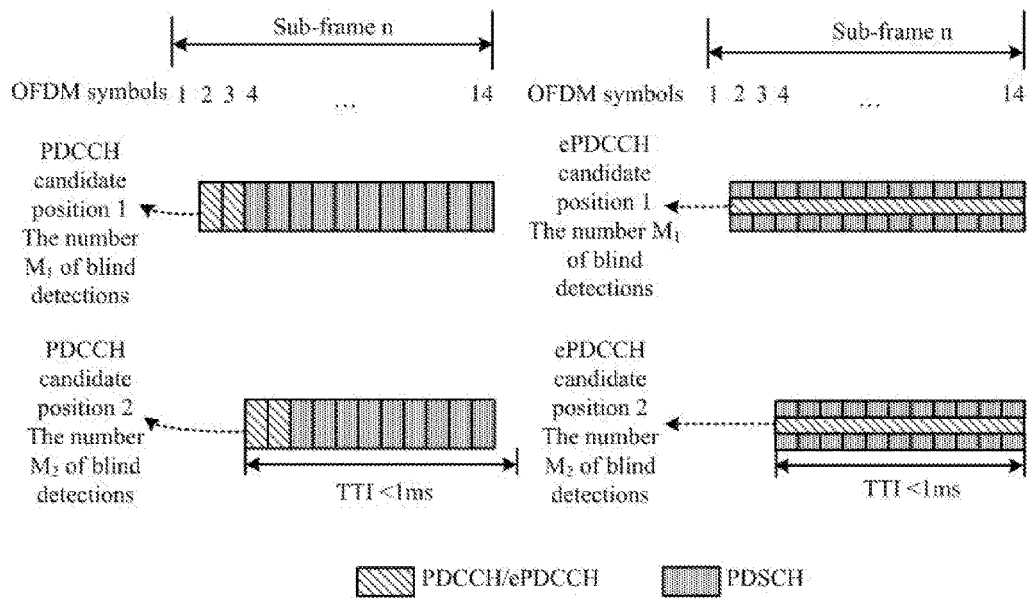
FIG. 5 is a schematic diagram of transmitting a PDCCH/ePDCCH in a partial sub-frame structure according to an embodiment of the invention.

In a particular embodiment, FIG. 5 illustrates a schematic structural diagram of transmitting a control channel in a partial sub-frame structure with an TTI less than 1 ms, where the base station transmits a PDCCH/ePDCCH and a PDSCH after accessing the channel at some candidate temporal position in the radio sub-frame n, and the terminal detects blindly at respective candidate PDCCH/ePDCCH resource positions corresponding to the candidate temporal position until the PDCCH/ePDCCH is parsed correctly, and then the terminal can determine a start position of the PDSCH to thereby decode the PDSCH in the partial sub-frame.

Figure 6:
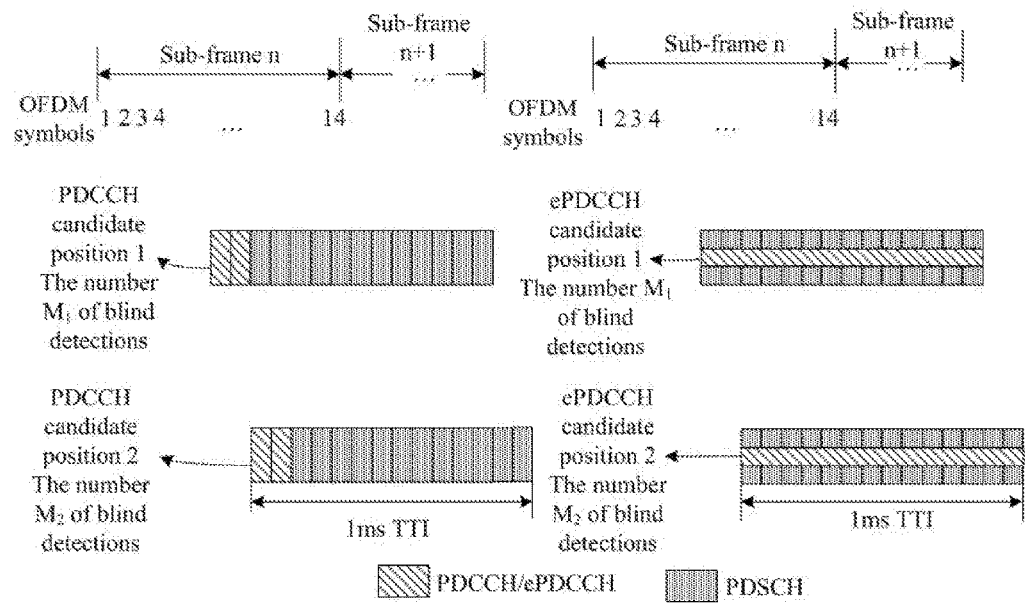
FIG. 6 is a schematic diagram of transmitting a PDCCH/ePDCCH in a floating sub-frame structure according to an embodiment of the invention.

In another particular embodiment, FIG. 6 illustrates a schematic structural diagram of transmitting a control channel in a floating sub-frame structure with an TTI equal to 1 ms, where the base station transmits a PDCCH/ePDCCH and a PDSCH after accessing the channel at some candidate temporal position in the radio sub-frame n, and the terminal detects blindly at respective candidate PDCCH/ePDCCH resource positions corresponding to the candidate temporal position until the PDCCH/ePDCCH is parsed correctly, and then the terminal can determine a start position of the PDSCH to thereby decode the TTI with the length of 1 ms in the radio sub-frame n and the radio sub-frame n+1.

Figure 7:
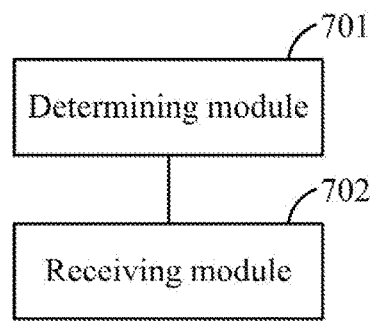
FIG. 7 is a schematic structural diagram of a terminal according to an embodiment of the invention.

Based upon the same inventive concept, an embodiment of the invention further provides a terminal, and reference can be made to the description of the embodiment of the method above for a particular implementation of the terminal, so a repeated description thereof will be omitted; and as illustrated in FIG. 7, the terminal generally includes following modules.

A determining module 701, configured to determine a PDCCH/ePDCCH, to carry DCI, in a radio frame in an unlicensed frequency band according to each candidate temporal position in a set of candidate temporal positions, and a set of candidate PDCCH/ePDCCH resource positions corresponding to the each candidate temporal position.

A receiving module 702, configured to receive the downlink control information in the determined PDCCH/ePDCCH.

In a particular implementation, the receiving module 702 is further configured to: receive the set of candidate temporal positions, and sets of candidate PDCCH/ePDCCH resource positions corresponding respectively to respective candidate temporal positions in the set of candidate temporal positions, transmitted by a base station.

In another particular implementation, the set of candidate temporal positions, and the sets of candidate PDCCH/ePDCCH resource positions corresponding respectively to the respective candidate temporal positions in the set of candidate temporal positions are prescribed between the terminal and a base station.

Particularly the determining module 701 is configured to: detect blindly at each candidate PDCCH/ePDCCH resource position in each set of candidate PDCCH/ePDCCH resource positions, so as to determine the PDCCH/ePDCCH, to carry the DCI, in the radio frame.

In an implementation, the sum of the numbers of candidate PDCCH/ePDCCH resource positions in respective sets of candidate PDCCH/ePDCCH resource positions corresponding respectively to the respective candidate temporal positions in the set of candidate temporal positions is not greater than a preset value.

Figure 8:
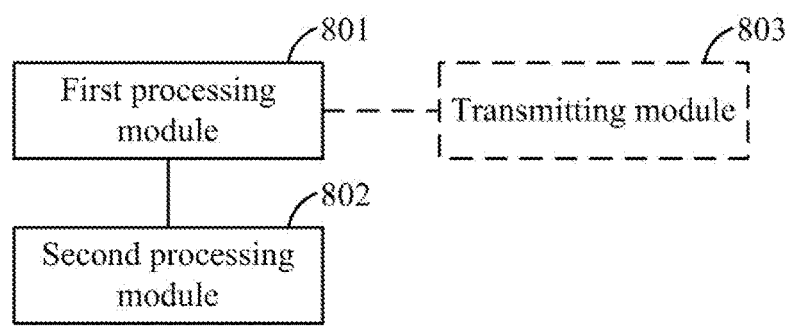
FIG. 8 is a schematic structural diagram of a base station according to an embodiment of the invention.

Based upon the same inventive concept, an embodiment of the invention further provides a base station, and reference can be made to the description of the embodiment of the method above for a particular implementation of the base station, so a repeated description thereof will be omitted; and as illustrated in FIG. 8, the base station generally includes following modules.

A first processing module 801, configured to determine a candidate temporal position at which a PDCCH/ePDCCH is transmitted in an unlicensed frequency band, according to a set of candidate temporal positions, where each candidate temporal position in the set of candidate temporal positions corresponds to a set of candidate PDCCH/ePDCCH resource positions.

A second processing module 802, configured to select a candidate PDCCH/ePDCCH resource position from a set of candidate PDCCH/ePDCCH resource positions corresponding to the determined candidate temporal position, and to transmit the PDCCH/ePDCCH at the determined candidate temporal position in the radio frame according to the selected candidate PDCCH/ePDCCH resource position.

In an implementation, the first processing module 801 is configured to: select a candidate temporal position from the set of candidate temporal positions according to a start temporal position at which a channel is accessed, after accessing the channel in the unlicensed frequency band, where the PDCCH/ePDCCH is to be transmitted at the selected candidate temporal position; or select a candidate temporal position from the set of candidate temporal positions, to determine the start temporal position at which the channel is accessed in the unlicensed frequency band, according to the selected candidate temporal position, and to determine that the PDCCH/ePDCCH is to be transmitted at the selected candidate temporal position.

In a particular implementation, the set of candidate temporal positions, and sets of candidate PDCCH/ePDCCH resource positions corresponding respectively to respective candidate temporal positions in the set of candidate temporal positions are prescribed between the base station and a terminal.

In another particular implementation, the first processing module 801 is further configured to: before the candidate temporal position at which the PDCCH/ePDCCH is transmitted in the unlicensed frequency band is determined according to the set of candidate temporal positions, determine the set of candidate temporal positions, and allocate, for the respective candidate temporal positions in the set of candidate temporal positions, their corresponding sets of candidate PDCCH/ePDCCH resource positions.

In a particular implementation, the base station further includes a transmitting module 803 configured to: transmit the set of candidate temporal positions, and the sets of candidate PDCCH/ePDCCH resource positions corresponding respectively to the respective candidate temporal positions in the set of candidate temporal positions to the terminal.

In an implementation, the sum of the numbers of candidate PDCCH/ePDCCH resource positions in the respective sets of candidate PDCCH/ePDCCH resource positions corresponding respectively to the respective candidate temporal positions in the set of candidate temporal positions is not greater than a preset value.

Figure 9:
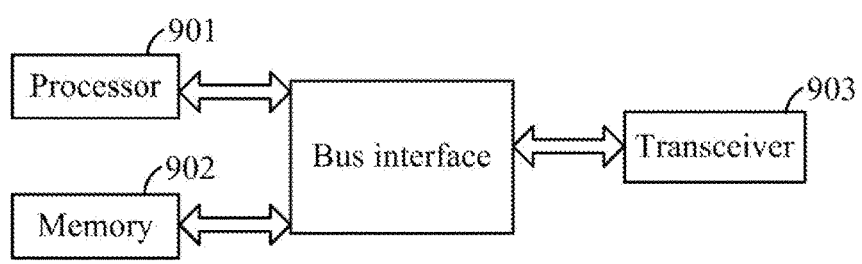
FIG. 9 is a schematic structural diagram of another UE according to an embodiment of the invention.

Based upon the same inventive concept, an embodiment of the invention further provides another terminal, and reference can be made to the description of the embodiment of the method above for a particular implementation of the terminal, so a repeated description thereof will be omitted; and as illustrated in FIG. 9, the terminal generally includes a processor 901, a memory 902, and a transceiver 903, where the transceiver 903 is configured to be controlled by the processor 901 to receive and transmit data, preset programs are stored in the memory 902, and the processor 901 is configured to read and execute the programs in the memory 902 to: determine a PDCCH/ePDCCH, to carry DCI, in a radio frame in an unlicensed frequency band according to each candidate temporal position in a set of candidate temporal positions, and a set of candidate PDCCH/ePDCCH resource positions corresponding to the each candidate temporal position; and instruct the transceiver 903 to receive the downlink control information in the determined PDCCH/ePDCCH.

In a particular implementation, the processor 901 is further configured to receive the set of candidate temporal positions, and sets of candidate PDCCH/ePDCCH resource positions corresponding respectively to respective candidate temporal positions in the set of candidate temporal positions, transmitted by a base station through the transceiver 903.

In another particular implementation, the set of candidate temporal positions, and the sets of candidate PDCCH/ePDCCH resource positions corresponding respectively to the respective candidate temporal positions in the set of candidate temporal positions are prescribed between the terminal and the base station.

Particularly the processor 901 is configured to detect blindly at each candidate PDCCH/ePDCCH resource position in each set of candidate PDCCH/ePDCCH resource positions, so as to determine the PDCCH/ePDCCH, to carry the DCI, in the radio frame.

In an implementation, the sum of the numbers of candidate PDCCH/ePDCCH resource positions in respective sets of candidate PDCCH/ePDCCH resource positions corresponding respectively to the respective candidate temporal positions in the set of candidate temporal positions is not greater than a preset value.

Here the bus architecture can include any number of interconnecting buses and bridges to particularly link together various circuits including one or more processors represented by the processor, and one or more memories represented by the memory. The bus architecture can further link together various other circuits, e.g., peripheral devices, manostats, power management circuits, etc., all of which are well known in the art, so a further description thereof will be omitted in this context. The bus interface serves as an interface. The transceiver can be a number of elements including a transmitter and a receiver, which are units for communication with various other devices over a transmission medium. The processor is responsible for managing the bus architecture and performing normal processes, and the memory can store data for use by the processor in performing the operations.

Figure 10:
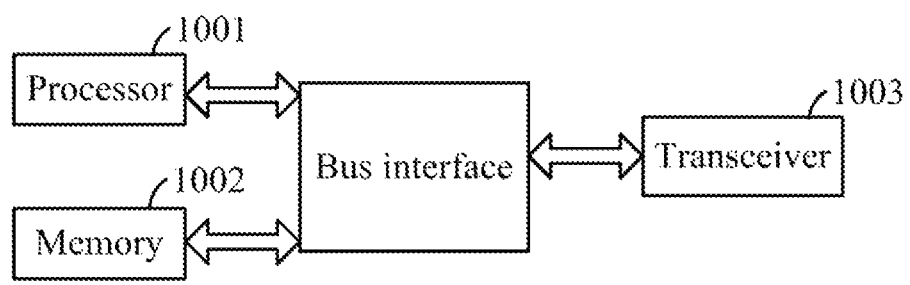
FIG. 10 is a schematic structural diagram of another base station according to an embodiment of the invention.

Based upon the same inventive concept, an embodiment of the invention further provides another base station, and reference can be made to the description of the embodiment of the method above for a particular implementation of the base station, so a repeated description thereof will be omitted; and as illustrated in FIG. 10, the base station generally includes a processor 1001, a memory 1002, and a transceiver 1003, where the transceiver 1003 is configured to be controlled by the processor 1001 to receive and transmit data, preset programs are stored in the memory 1002, and the processor 1001 is configured to read and execute the programs in the memory 1002 to: determine a candidate temporal position at which a PDCCH/ePDCCH is transmitted in an unlicensed frequency band, according to a set of candidate temporal positions, where each candidate temporal position in the set of candidate temporal positions corresponds to a set of candidate PDCCH/ePDCCH resource positions; and select a candidate PDCCH/ePDCCH resource position from the set of candidate PDCCH/ePDCCH resource positions corresponding to the determined candidate temporal position, and to transmit the PDCCH/ePDCCH at the determined candidate temporal position in the radio frame according to the selected candidate PDCCH/ePDCCH resource position.

In an implementation, the processor 1001 is configured to select a candidate temporal position from the set of candidate temporal positions according to a start temporal position at which a channel is accessed, after accessing the channel in the unlicensed frequency band, where the PDCCH/ePDCCH is to be transmitted at the selected candidate temporal position; or the processor 1001 is configured to select a candidate temporal position from the set of candidate temporal positions, to determine the start temporal position at which the channel is accessed in the unlicensed frequency band, according to the selected candidate temporal position, and to determine that the PDCCH/ePDCCH is to be transmitted at the selected candidate temporal position.

In a particular implementation, the set of candidate temporal positions, and sets of candidate PDCCH/ePDCCH resource positions corresponding respectively to respective candidate temporal positions in the set of candidate temporal positions are prescribed between the base station and a terminal.

In another particular implementation, the processor 1001 is further configured, before the candidate temporal position at which the PDCCH/ePDCCH is transmitted in the unlicensed frequency band is determined according to the set of candidate temporal positions, to determine the set of candidate temporal positions, and to allocate, for the respective candidate temporal positions in the set of candidate temporal positions, their corresponding sets of candidate PDCCH/ePDCCH resource positions.

In a particular implementation, the processor 1001 is further configured to transmit the set of candidate temporal positions, and the sets of candidate PDCCH/ePDCCH resource positions corresponding respectively to the respective candidate temporal positions in the set of candidate temporal positions to the terminal through the transceiver 1003.

In an implementation, the sum of the numbers of candidate PDCCH/ePDCCH resource positions in the respective sets of candidate PDCCH/ePDCCH resource positions corresponding respectively to the respective candidate temporal positions in the set of candidate temporal positions is not greater than a preset value.

Here the bus architecture can include any number of interconnecting buses and bridges to particularly link together various circuits including one or more processors represented by the processor, and one or more memories represented by the memory. The bus architecture can further link together various other circuits, e.g., peripheral devices, manostats, power management circuits, etc., all of which are well known in the art, so a further description thereof will be omitted in this context. The bus interface serves as an interface. The transceiver can be a number of elements including a transmitter and a receiver, which are units for communication with various other devices over a transmission medium. The processor is responsible for managing the bus architecture and performing normal processes, and the memory can store data for use by the processor in performing the operations.

With the technical solutions, in the embodiments of the invention, the base station and the terminal prescribe the set of candidate temporal positions at which the PDCCH is transmitted in the unlicensed frequency band, and the sets of candidate PDCCH/ePDCCH resource positions corresponding respectively to the respective candidate temporal positions in the set of candidate temporal positions, and the base station transmits the PDCCH at a prescribed candidate temporal position, and candidate PDCCH/ePDCCH resource positions corresponding to the prescribed candidate temporal position; and the terminal detects blindly the PDCCH/ePDCCH at prescribed candidate temporal positions, and candidate PDCCH/ePDCCH resource positions corresponding to the prescribed candidate temporal positions, so that a start position of the PDSCH can be determined according to the detected PDCCH without transmitting any initial signal or any signaling indicating the start position of the PDSCH.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for transmitting a physical downlink control channel, the method comprising:
    determining, by a terminal, a Physical Downlink Control Channel/enhanced Physical Downlink Control Channel (PDCCH/ePDCCH), to carry Downlink Control Information (DCI), in a radio frame in an unlicensed frequency band according to each candidate temporal position in a set of candidate temporal positions, and a set of candidate PDCCH/ePDCCH resource positions corresponding to the each candidate temporal position; and
    receiving, by the terminal, the DCI in the determined PDCCH/ePDCCH.

2. The method according to claim 1, wherein the set of candidate temporal positions, and sets of candidate PDCCH/ePDCCH resource positions corresponding respectively to respective candidate temporal positions in the set of candidate temporal positions are notified by a base station to the terminal, or prescribed between the terminal and the base station.

3. The method according to claim 1, wherein determining, by the terminal, the PDCCH/ePDCCH, to carry the DCI, in the radio frame according to the each candidate temporal position, and the set of candidate PDCCH/ePDCCH resource positions corresponding to the each candidate temporal position comprises:
    detecting, by the terminal, blindly at each candidate PDCCH/ePDCCH resource position in each set of candidate PDCCH/ePDCCH resource positions, so as to determine the PDCCH/ePDCCH, to carry the DCI, in the radio frame.

4. The method according to claim 1, wherein a sum of numbers of candidate PDCCH/ePDCCH resource positions in respective sets of candidate PDCCH/ePDCCH resource positions corresponding respectively to respective candidate temporal positions in the set of candidate temporal positions is not greater than a preset value.

5. A method for transmitting a physical downlink control channel, the method comprising:
    determining, by a base station, a candidate temporal position at which a Physical Downlink Control Channel/enhanced Physical Downlink Control Channel (PDCCH/ePDCCH) is transmitted in an unlicensed frequency band, according to a set of candidate temporal positions, wherein each candidate temporal position in the set of candidate temporal positions corresponds to a set of candidate PDCCH/ePDCCH resource positions; and selecting, by the base station, a candidate PDCCH/ePDCCH resource position from a set of candidate PDCCH/ePDCCH resource positions corresponding to the determined candidate temporal position, and transmitting the PDCCH/ePDCCH at the determined candidate temporal position in the radio frame according to the selected candidate PDCCH/ePDCCH resource position.

6. The method according to claim 5, wherein determining, by the base station, the candidate temporal position at which the PDCCH/ePDCCH is transmitted in the unlicensed frequency band, according to the set of candidate temporal positions comprises:

selecting, by the base station, a candidate temporal position from the set of candidate temporal positions according to a start temporal position at which a channel is accessed, after accessing the channel in the unlicensed frequency band, wherein the PDCCH/ePDCCH is to be transmitted at the selected candidate temporal position; or selecting, by the base station, a candidate temporal position from the set of candidate temporal positions, determining the start temporal position at which the channel is accessed in the unlicensed frequency band, according to the selected candidate temporal position, and determining that the PDCCH/ePDCCH is to be transmitted at the selected candidate temporal position.

7. The method according to claim 6, wherein the set of candidate temporal positions, and sets of candidate PDCCH/ePDCCH resource positions corresponding respectively to respective candidate temporal positions in the set of candidate temporal positions are prescribed between the base station and a terminal, or determined by the base station.

8. The method according to claim 7, wherein after the base station determines the set of candidate temporal positions, and allocates, for the respective candidate temporal positions in the set of candidate temporal positions, their corresponding sets of candidate PDCCH/ePDCCH resource positions, the method further comprises:

transmitting, by the base station, the set of candidate temporal positions, and the sets of candidate PDCCH/ePDCCH resource positions corresponding respectively to the respective candidate temporal positions in the set of candidate temporal positions to the terminal.

9. The method according to claim 5, wherein a sum of numbers of candidate PDCCH/ePDCCH resource positions in respective sets of candidate PDCCH/ePDCCH resource positions corresponding respectively to respective candidate temporal positions in the set of candidate temporal positions is not greater than a preset value.

10. A terminal, comprising:
a determining module configured to determine a Physical Downlink Control Channel/enhanced Physical Downlink Control Channel (PDCCH/ePDCCH), to carry Downlink Control Information (DCI), in a radio frame in an unlicensed frequency band according to each candidate temporal position in a set of candidate temporal positions, and a set of candidate PDCCH/ePDCCH resource positions corresponding to the each candidate temporal position; and
a receiving module configured to receive the DCI in the determined PDCCH/ePDCCH.

11. The terminal according to claim 10, wherein the receiving module is further configured to:
receive the set of candidate temporal positions, and sets of candidate PDCCH/ePDCCH resource positions corresponding respectively to respective candidate temporal positions in the set of candidate temporal positions, transmitted by a base station.

12. The terminal according to claim 10, wherein the set of candidate temporal positions, and sets of candidate PDCCH/ePDCCH resource positions corresponding respectively to respective candidate temporal positions in the set of candidate temporal positions are prescribed between the terminal and a base station.

13. The terminal according to claim 10, wherein the determining module is configured to:
detect blindly at each candidate PDCCH/ePDCCH resource position in each set of candidate PDCCH/ePDCCH resource positions, so as to determine the PDCCH/ePDCCH, to carry the DCI, in the radio frame.

14. The terminal according to claim 10, wherein a sum of numbers of candidate PDCCH/ePDCCH resource positions in respective sets of candidate PDCCH/ePDCCH resource positions corresponding respectively to respective candidate temporal positions in the set of candidate temporal positions is not greater than a preset value.

15. A base station, comprising:
a first processing module configured to determine a candidate temporal position at which a Physical Downlink Control Channel/enhanced Physical Downlink Control Channel (PDCCH/ePDCCH) is transmitted in an unlicensed frequency band, according to a set of candidate temporal positions, wherein each candidate temporal position in the set of candidate temporal positions corresponds to a set of candidate PDCCH/ePDCCH resource positions; and
a second processing module configured to select a candidate PDCCH/ePDCCH resource position from a set of candidate PDCCH/ePDCCH resource positions corresponding to the determined candidate temporal position, and to transmit the PDCCH/ePDCCH at the determined candidate temporal position in the radio frame according to the selected candidate PDCCH/ePDCCH resource position.

16. The base station according to claim 15, wherein the first processing module is configured to:
select a candidate temporal position from the set of candidate temporal positions according to a start temporal position at which a channel is accessed, after accessing the channel in the unlicensed frequency band, wherein the PDCCH/ePDCCH is to be transmitted at the selected candidate temporal position; or
select a candidate temporal position from the set of candidate temporal positions, to determine the start temporal position at which the channel is accessed in the unlicensed frequency band, according to the selected candidate temporal position, and to determine that the PDCCH/ePDCCH is to be transmitted at the selected candidate temporal position.

17. The base station according to claim 16, wherein the set of candidate temporal positions, and sets of candidate PDCCH/ePDCCH resource positions corresponding respectively to respective candidate temporal positions in the set of candidate temporal positions are prescribed between the base station and a terminal.

18. The base station according to claim 16, wherein the first processing module is further configured to:

before the candidate temporal position at which the PDCCH/ePDCCH is transmitted in the unlicensed frequency band is determined according to the set of candidate temporal positions, determine the set of candidate temporal positions, and allocate, for respective candidate temporal positions in the set of candidate temporal positions, their corresponding sets of candidate PDCCH/ePDCCH resource positions.

19. The base station according to claim 18, wherein the base station further comprises a transmitting module configured to:

transmit the set of candidate temporal positions, and the sets of candidate PDCCH/ePDCCH resource positions corresponding respectively to the respective candidate temporal positions in the set of candidate temporal positions to a terminal.

20. The base station according to claim 15, wherein a sum of numbers of candidate PDCCH/ePDCCH resource positions in respective sets of candidate PDCCH/ePDCCH resource positions corresponding respectively to respective candidate temporal positions in the set of candidate temporal positions is not greater than a preset value.

* * * * *